Patented Apr. 10, 1923.

1,451,135

UNITED STATES PATENT OFFICE.

ALBERT W. WRIGHT AND ELISABETH H. WRIGHT, OF SAN FRANCISCO, CALIFORNIA.

FOOD PRODUCT AND PROCESS OF PRODUCTION.

No Drawing.   Application filed March 17, 1920. Serial No. 366,634.

*To all whom it may concern:*

Be it known that we, ALBERT W. WRIGHT and ELISABETH H. WRIGHT, citizens of the United States, residing at city and county of San Francisco and State of California, have invented a new and useful Improvement in Food Products and Processes of Production, of which the following is a specification.

This invention relates to a food product and a method of production.

It is the principal object of the present invention to provide new food products such as jellies, jams, marmalades, and preserves which are made from the inner portion of melons, exclusive of rind and seeds, and also to prepare products from melons which may be used as a base in making preserves, jams, marmalades or jellies, said base to be flavored with any desired flavoring matter and in this manner providing a process by which various melons which are now considered as waste products may be preserved and converted to some practical purpose for human consumption at other times than when eaten raw.

Broadly considered, the present invention contemplates the use of the inner portion of a melon, exclusive of its rind and seeds, in the production of the food products previously mentioned, said portion being cooked and treated in a manner to reduce it to a solid food product within which considerable pectin develops or is introduced to produce jellification of the mass and to provide a palatable jelly or preserve.

In carrying out this invention in making jams, marmalades and preserves, muskmelons, cantaloupes, casabas, Persian melons, honey dew melons or watermelons are prepared by cutting away the outer rind of the melon and retaining all the inner portion of the melon. The rind and seeds are discarded while all the juices and pulp are retained. The retained portion of the melon is then cut into small, thin pieces. This cut melon and the juice are placed in the cooker and brought quickly to the boiling point. The complete mass is then cooked at a temperature of 212° to 220° F. for approximately one hour or in fact, until the melon is quite tender. The pieces of the melon are slightly mashed while stirring. When making marmalades, jams or preserves, it is preferable to add two ripe lemons or other citrous fruits sliced very thin, to each gallon of the mass before the cooking operation is begun and it is also to be understood that variation in the length of the cooking operation may be made as determined by the amount of juice within the mass. After the mass has been cooked for approximately one hour, the contents of the cooker is then weighed, or measured and sugar added approximating one-half of the weighed mass. After thoroughly mixing, the sugar and melon are returned to the cooker and boiled until the juice thickens. This usually requires 30 to 40 minutes during which time it is advisable to frequently stir the mass. When this boiling operation has been completed the melon and syrup juices are then ready for immediate use or may be kept indefinitely within hermetically sealed and acid proof containers. This process will produce marmalades, jams or preserves and due to the delicate flavor of the food product it may be used as a base for carrying any desired natural fruit flavor or flavoring extract. In this manner by using this food as a stock base other fruits or extracts may be added in proportions of from 15 to 30% so that various flavors and combinations of flavors may be obtained other than the original melon flavor.

In making jelly from the melons previously mentioned, the melons are prepared in the manner described and may thereafter be cut in small pieces for convenience in cooking. The proportions of parts which will be hereinafter set forth are based upon the production of one gallon of the melon in which case 4 to 6 ripe lemons or other citrus fruit are sliced thin and placed in the cooking utensil with the one gallon of melon. The mass is then brought slowly to a boiling point thus extracting a maximum amount of juice from the pulp. The boiling is maintained at a temperature ranging from 212° to 214° F., until the melon has been reduced to a pulpy mass. This mass is continuously stirred and mashed during the cooking operation which in fact ranges from 35 to 45 minutes and thereafter the mass is drained or filtered through a jelly strainer to obtain the juices while discarding the pulp. When the juices are cool a test is made for pectin. It is usual in a test of this sort to mix one tablespoonful of the cold juice with one tablespoonful of grain alcohol of 90 to 95% after which these two liquids are allowed to stand one-half hour while being occasionally stirred. In the event that sufficient pectin is present to produce jellification it will be indicated by the presence of a gelatinous mass which may be gathered in a spoon.

If this test proves favorable no pectin is added, however, if the pectin test shows less than one-half, desirable commercial or natural pectin is added in a sufficient quantity to produce jellification. The cooked juice is then returned to the fire and brought quickly to a boil, after which a proportion of sugar is added to the juice while it is boiling at a temperature of from 220° to 222° F. until a point of solidification has been reached. The amount of sugar added is, of course, dependent upon the proportion of pectin in the juice and under normal conditions an amount equal to ¾ of the weight of the jelly is added. After a point of jellification has been reached the jelly is at once placed in containers ready for use or may be indefinitely preserved by placing in acid-proof jars or glasses.

While we have shown the preferred form of our invention as now known to us, it will be understood that various changes in the combination, and proportion of parts may be made by those skilled in the art without departing from the spirit of the invention as claimed.

Having thus described our invention, what we claim and desire to secure by Letters Patent, is:

1. A fruit jelly made from the juices extracted from the inner fleshy portion of melons and with which sugar is cooked.

2. A new food product comprising a base of the preserved fleshy part of melons to which flavoring matter has been added.

3. The process of producing a new food product which consists in removing and discarding the entire rind and seeds from melons, thereafter adding sugar and cooking the mass comprising the juices and inner fleshy portion of the melon until the consistency of syrup has been reached.

4. A food product comprising the inner fleshy portion of a melon devoid of its rind and seeds, cooked with its juices and an addition of sugar solely.

In testimony whereof we have hereunto set our hand in the presence of two subscribing witnesses.

ALBERT W. WRIGHT.
ELISABETH H. WRIGHT.

Witnesses:
W. W. HEALEY,
M. E. EWING.